June 12, 1928.

Re. 16,996

W. F. SPEAKMAN ET AL

SECTIONAL DERRICK LEG CLAMP

Original Filed July 14, 1926

Inventors

Walter F. Speakman,
Guy E. Crockett by Charles Stillz Attys.

Reissued June 12, 1928. Re. 16,996

UNITED STATES PATENT OFFICE.

WALTER F. SPEAKMAN AND GUY E. CROCKETT, OF DRUMRIGHT, OKLAHOMA.

SECTIONAL DERRICK LEG CLAMP.

Original No. 1,616,995, dated February 8, 1927, Serial No. 122,400, filed July 14, 1926. Application for reissue filed August 25, 1927. Serial No. 215,490.

This invention relates generally to well derricks and has more particular reference to a clamp for the sectional legs of the derrick, the primary object of the invention residing in the provision of such a clamp wherein the adjacent ends of the leg sections are positively interconnected.

Frequently the dropping of heavy tools from the top of a tall derrick causes a rebound of the derrick which sometimes jumps the leg sections out of the generally used clamps causing the derrick to collapse. Wind storms often sway derricks and spring them in such a manner as to cause the leg sections to be drawn out of the clamps and the entire derrick to collapse. Through the medium of the present type of clamp, these hazards are eliminated and consequently a safety derrick construction is provided.

An additional object of the invention is to provide a clamp that is of such a nature as to permit the rapid construction or knocking down of the derrick.

Other objects will become apparent as the nature of the invention will be better understood, the same comprising the novel form, combination, and arrangement of parts hereinafter more fully described, shown in the accompanying drawing and claimed.

In the drawing wherein like reference characters indicate like parts throughout the several views.

Figure 1:
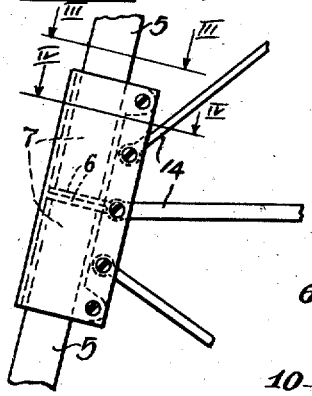
Figure 1 is a fragmentary elevation of a well derrick, the leg sections thereof being interconnected by reason of a clamp constructed in accordance with the present invention.
Figure 2:
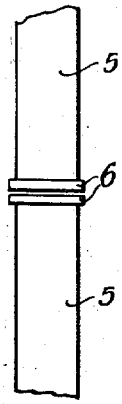
Figure 2 is a fragmentary view of a pair of derrick leg sections arranged in end to end relation, said ends being so constructed as to permit the use of the clamp of the present type.
Figure 6:
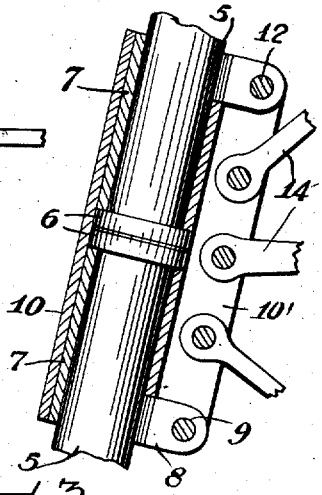
Figure 6 is a longitudinal sectional view taken on substantially line VI—VI of Figure 3, with parts in elevation.
Figure 3:
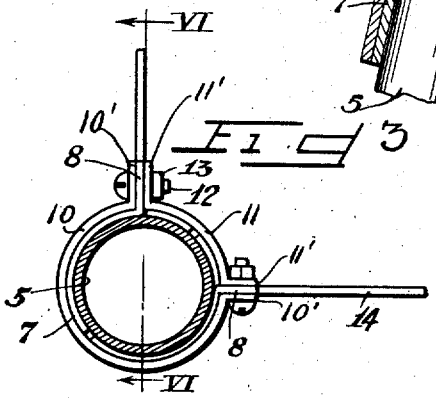
Figure 3 is an enlarged detail longitudinal section taken substantially upon the line 3—3 of Figure 1 and looking downwardly in the direction of the arrows for disclosing the present clamp in upper end elevation.
Figure 4:
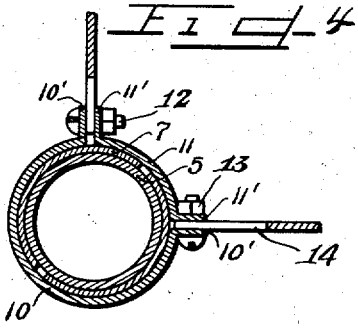
Figure 4 is an enlarged detail section taken substantially upon the line 4—4 of Figure 1 for disclosing the clamp in cross section.
Figure 5:
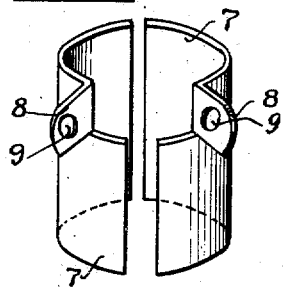
Figure 5 is a perspective of a sectional shim, a pair of which are employed as elements of the present invention.

As is well known, the legs of metallic derrick constructions are made up of tubular sections interconnected in end to end relation, and this by reason of a large variety of clamps now in use. In the drawing the pair of leg sections disclosed are designated 5—5 and in accordance with my invention, the ends of these sections are circumferentially flanged as at 6—6. The clamp per se constitutes the provision of a pair of tubular metallic shims 7—7, each of which is of half section formation as disclosed in Figure 5, said shims being arranged over the tubular leg sections 5—5 directly within the flanges 6 thereof as illustrated by the dotted lines in Figure 1. At one edge of each of the shim sections and at the outer end thereof, the same is formed with an outwardly extending lateral ear 8 formed with an opening 9, these ears being preferably formed by cutting the material in a horizontal manner and a predetermined distance towards the center of each section and then bending the same outwardly, which is of course an obvious expedient.

The clamp further consists of a metallic tube 10 formed throughout its length with an opening substantially equivalent to one fourth of the circumference thereof so as to permit the disposition of the tube over the shims 7—7 upon the sections of the derrick leg, after which an insert 11 is arranged within the opening.

The vertical edges of the tube 10 as well as the insert 11 are formed with lateral flanges 10′ and 11′ respectively, to facilitate their rigid connection by reason of bolts 12 and nuts 13 as clearly disclosed in Figures 1, 3, 4 and 6, said flanges being provided with pre-arranged openings for this purpose. The ears 8 of the shim sections will be disposed between these flanges and be secured thereto by the bolt and nut connections at the opposite ends of the clamps as disclosed in Figure 3 and by the dotted lines in Figure 1. Further, the brace and strut rods 14 of the derrick construction will be arranged at their ends between the flanges of the tube 10 and insert 11 also to be secured thereto by reason of said bolt and nut connection.

It will thus be seen that the leg sections 5—5 will be positively interconnected and thus prevented from any longitudinal or lateral movement with respect to each other for overcoming the great disadvantages of a derrick construction as heretofore mentioned.

Having thus described the invention, what we claim as new and desire to secure by Letters Patent is:—

1. In a clamp for sectional derrick legs wherein the ends of the sections are provided with circumferential flanges, shims disposed around the ends of the sections directly in back of said flanges, a tube arranged over said shims and means for positively interconnecting said tube and said shims.

2. In a clamp for sectional derrick legs wherein the ends thereof are provided with lateral abutments, shims mounted upon the ends of the sections directly in back of said abutments, a tube arranged over the shims and means positively connecting the tube to said shims.

3. In a clamp for sectional derrick legs wherein the ends of the sections are provided with lateral abutments, shims disposed upon the ends of the sections in back of said abutments, a tube arranged over the shims and complementary construction between the shims and tube whereby the same may be positively interconnected.

4. In a clamp for sectional derrick legs wherein the ends of the sections are provided with lateral abutments, sectional metallic shim arranged over the ends of the leg sections directly in back of said abutments, a sectional tube arranged over the shims and complementary construction between the tube sections and said shim sections whereby the shims may be positively secured to said tube.

5. In a clamp for sectional derrick legs wherein the ends of the sections are provided with lateral abutments, shims disposed around the ends of the sections directly in back of the abutments, a sectional tube arranged over the pair of shims, and positive connections between the shims and the sections of the tube.

6. In a clamp for sectional derrick legs wherein the ends of the sections are provided with lateral abutments, sectional shims disposed around the ends of the sections directly in back of the abutments, a sectional tube arranged over the pair of shims, and means formed integral with the shim sections, and tube sections whereby said shim and tube sections may be positively interconnected.

7. A clamp for sectional derrick legs, comprising sectional shims adapted to be secured in fixed relation upon respective abutting ends of a sectional derrick leg, a sectional tube arranged over said shims, said shims and tube being formed with cooperating flanges and means for securing said shims to said tube through said flanges.

8. A clamp for sectional derrick legs, comprising shims adapted to be secured in fixed relation upon respective abutting ends of a sectional derrick leg, a tubular member overlapping said shims, said shims and tubular member being formed with cooperating flanges and means for securing said shims to said tubular member through said flanges.

In testimony whereof, we have hereunto subscribed our names at Tulsa, Tulsa County, Oklahoma.

WALTER F. SPEAKMAN.
GUY E. CROCKETT.